J. W. DWIGGINS.
WIRE FENCE MACHINE.
APPLICATION FILED SEPT. 17, 1909.

1,215,353.

Patented Feb. 13, 1917.
9 SHEETS—SHEET 7.

UNITED STATES PATENT OFFICE.

JOHN W. DWIGGINS, OF MUNCIE, INDIANA, ASSIGNOR TO JOHN E. FREDRICK, OF KOKOMO, INDIANA.

WIRE-FENCE MACHINE.

1,215,353.   Specification of Letters Patent.   Patented Feb. 13, 1917.

Application filed September 17, 1909.   Serial No. 518,291.

*To all whom it may concern:*

Be it known that I, JOHN W. DWIGGINS, a citizen of the United States, residing at Muncie, in the county of Delaware and State of Indiana, have invented certain new and useful Improvements in Wire-Fence Machines; and I do hereby declare that the following is a full, clear, and exact description of the invention, which will enable others skilled in the art to which it appertains to make and use the same.

This invention has reference to certain new and useful improvements in machines used for the manufacture of farm or field fencing, the fence or fabric made including longitudinal or strand wires spaced at suitable distances apart and stay wires or pickets extending transversely across said longitudinal or strand wires and united to the same, preferably by forming loops in the stays at points where the stays intersect the intermediate strands, which said loops are wrapped around the strands and the ends of the stays coiled about the outside or marginal strands of the fence.

One of the objects of the present invention is to intermittently advance the strand wires through coiling spindles having wrapping heads and a retractable looping pin or tool; the tools or pins of the intermediate coiling spindles only being arranged to form loops in the stay wires and the wrapping heads arranged to subsequently wrap said loops around coinciding strand wires. The tools or pins of the outside or marginal wrappers are arranged to draw the ends of the stays down into the wrapping heads, whereby the ends of the stays are coiled about the outside or marginal wires.

A further object of the invention is to provide mechanism for progressively operating successive coiling spindles and their wrapping heads, beginning with the second coiling spindle from one end of the series of spindles and providing for the concurrent operation of the first spindle with that of said second spindle, whereby the wire for forming the loops in the stay wire will be drawn toward said concurrently operated spindles and not from the end of the stay coinciding with said concurrently operated spindles.

The invention has for a further object to arrange the operating means for the coiling spindles so that the looping operation of the wrapping heads will be brought about in succession, and that each successive wrapping head will not be brought into action until the adjacent or preceding wrapping head has been rotated sufficiently to form a loop in the stay and direct said loop about the strand wire passing through its spindle. In this way, there will be nothing to interfere with the looping operation of each wrapping head and all danger of breakage of the stay wire is obviated. The arrangement of the coiling spindle operating means is such, however, that subsequent to the looping of one portion of the stay and during the operation of wrapping said loop about a strand wire and before such wrapping operation is completed, another wrapping head is caused to be operated for looping another portion of the stay and said loop is wrapped about its coinciding strand; thus it will be seen that although the looping operations of the wrappers are not started at the same time, they do operate at the same time, and there may be a number operating at the same time.

The invention has for its further object to provide a magazine feed for the stay wires, said magazine disposed transversely to the direction of feed of the strand wires and arranged to receive a plurality of predetermined lengths of wire, forming stays, severed from a stay-feed-wire arranged to be suitably fed to said magazine; there are also a plurality of coiling spindles provided with wrapping heads and looping pins to which the stay lengths are fed sidewise, and means for progressively operating said coiling spindles for forming loops in the stay length and subsequently wrapping said loops around strand wires passing through said spindles.

The invention has reference also to new and improved means for retracting and holding the pins of the wrapping heads retracted for a predetermined period, and also to the means for insuring the delivery of the stay lengths from the magazine onto the wrapping heads, whereby the looping and wrapping operations may be performed by said pins and wrapping heads.

For a further and full description of the invention herein and the merits thereof and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings, in which:—

Fig. 15 is an enlarged elevation showing a fan-cam-wheel and coöperating parts which governs the movement of the stay-feed-wire mechanism;

Fig. 23 is a view similar to Fig. 5, except that the construction of one of the end coilers is shown instead of one of the intermediate coilers;

Fig. 24 is a view similar to Fig. 23 and showing the same parts, but with the looping pin retracted.

Like numerals and letters of reference indicate corresponding parts throughout the figures.

The framework of the machine comprises the two side frame parts 1 and 2, formed with a shelf portion 3 to which is secured a bed-plate 4 adapted to support and form a bearing for the coiling spindles and the stay magazine, and also to support parts coöperating with the spindles and stays as they are fed to the spindles.

5 designates a plurality of axially bored spindles which at their upper ends are provided with wrapping heads 6 having a bearing in openings 7 of the bed-plate 4 and their lower ends pass through and have a bearing in the cross-frame part 8 secured at its opposite ends to the frames 1 and 2. On the extreme lower ends of the spindles 5 are secured bevel pinions 9 in meshing relation with bevel pinions 10 on the forward ends of horizontally disposed shafts 11 which have their forward ends journaled in the forward portion of the cross-frame 8 and their rear ends pass through and are journaled in the rear portion of said cross-frame 8. The manner of operating the shafts 11 will be hereinafter explained.

The wrapping heads 6 of the spindles 5 are preferably disk shaped and may or may not be formed integrally with the upper ends of the spindles. The heads 6 extend only part way up through the openings 7 in the bed-plate 4 and to their upper faces are suitably secured caps 13, which, when attached to the heads 6, become a fixed part with said heads and fill the remaining space of the openings 7 and have their upper faces flush with the top face of the bed-plate 4. Each cap plate is provided with an elongated radially disposed opening or slot 14 extending from the center of the cap to a suitable point near the peripheral edge of the cap, and said slot or opening communicates with an annular recess 15 in the underside of the cap, which has an acting wall 15ᵃ for purposes to be explained.

Slidably arranged on each spindle is a sleeve 16 and each sleeve is provided with a lower annular flange 17, an intermediate flange 18 and a head 19. The head and flanges correspond in diameter to the wrapping heads 6 of the spindles, leaving the main body portion which is offset between the flanges and flange and head. To the head 19 of each sleeve 16 is secured a retractable pin 20 which extends up above each head 19 and is reciprocally carried through an opening 21 in the wrapping head 6 and out through the opening 14 in the cap plate 13, for purposes which will be explained.

Figure 9:
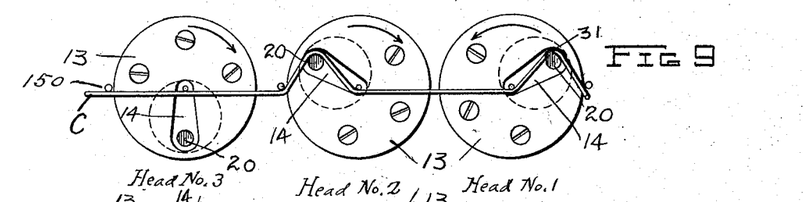
Fig. 9 is an enlarged plan view of three of the wrapping heads and their retractable pins, showing the first and second heads which are concurrently operated and also the third head which is operated subsequently to the starting of said second head and before said second head has completed its operation; the first and second heads shown in the act of being rotated, just prior to the operation of the third head.
Figures 10, 11, 12, 13:
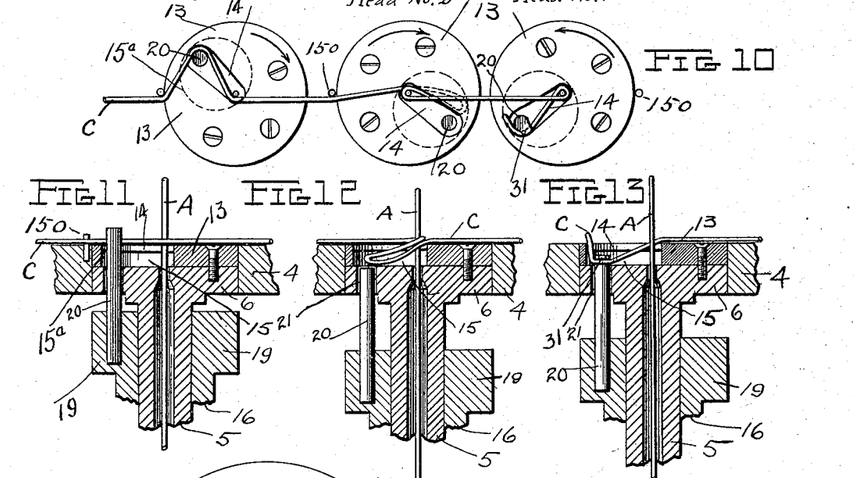
Fig. 10 is a view similar to Fig. 9 except that the third head is being operated simultaneously with said first and second heads. The second head having just completed its loop, the third head in the act of looping and the first head coiling the end of the stay wire about the marginal wire.
Fig. 11 is a vertical cross-section of either the second or third head shown in Fig. 9, but showing the pin about to engage the stay wire.
Fig. 12 is a view similar to Fig. 11, except that the pin has formed its loop and been retracted drawing the loop into a recess in the wrapping head.
Fig. 13 is a cross-section of the first head shown in Fig. 9, showing the retractable pin drawing the end of the stay into the recess in the wrapping head and holding said stay during the operation of coiling it about the marginal wire.
Figure 14:
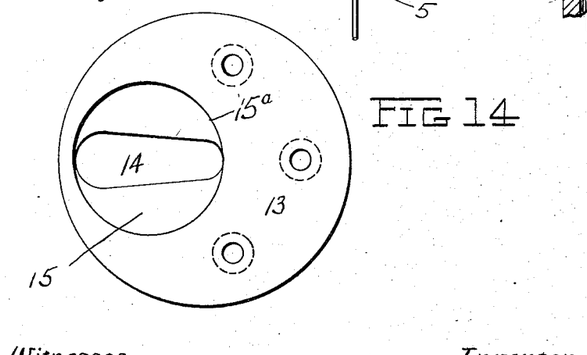
Fig. 14 is an enlarged bottom plan view of a cap for one of the wrapping heads.
Figure 17:
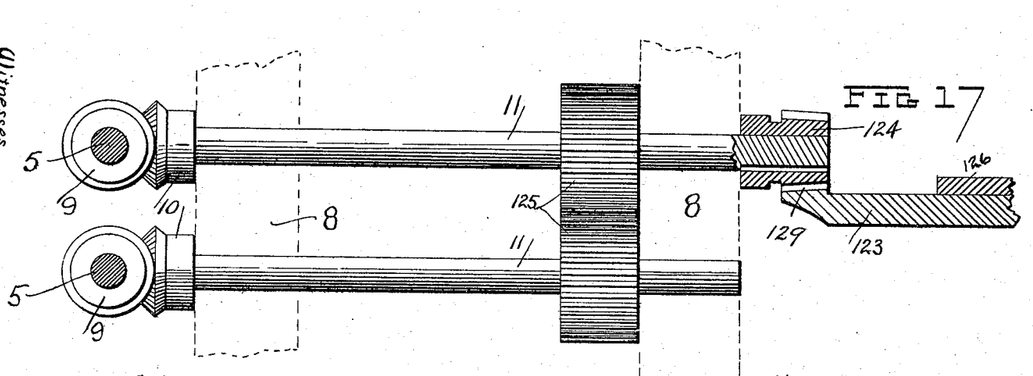
Fig. 17 is an enlarged plan view partly in section showing the driving means for the first and second spindles and a part of the mutilated gear for operating the first and second spindles concurrently, said mutilated gear being in mesh with the bevel pinion of the second spindle.
Figures 18, 19, 22:
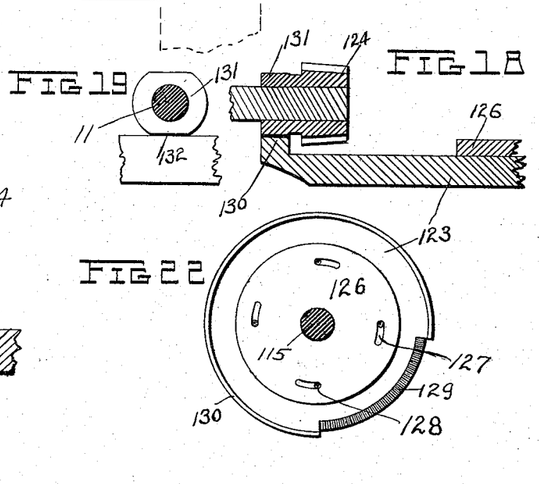
Fig. 18 is an enlarged sectional detail of a part of one of the mutilated driving gears for the spindles and its coacting pinion, the pinion and gear being in that position which holds the pinion against rotation during approximately three-quarters of a revolution of the mutilated gear wheel.
Fig. 19 is an end view of the head attached to the pinion, shown in Fig. 18, showing its flat faces which have a slidable relation with the flange of the mutilated gear to hold the pinion against rotation.
Fig. 22 is a face view of one of the mutilated gears.
Figure 20:
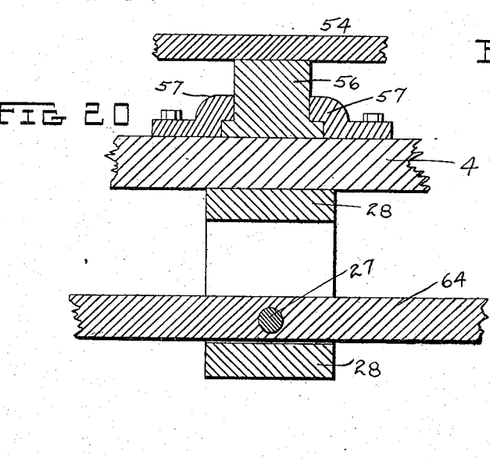
Fig. 20 is a sectional detail on the line 20—20 of Fig. 5 looking in the direction of the arrow in said figure.

Each sleeve is normally held in an upward position with its retractable pin 20 projecting up through the opening 14 in the plate 13, by means of a spring 22 coiled about the spindle 5 and bearing between the lower flange 17 of the sleeve and a collar 23 on the spindle. At a predetermined interval during the rotation of each spindle, the sleeve 16 is reciprocated, being drawn downwardly on its spindle so as to retract the pin 20 from the position shown in Fig. 11 to that position shown in Fig. 12. This is accomplished by means of cam-lugs 24 formed on the upper faces of the lower flanges 17 of the sleeves 16, which will engage and ride beneath rollers 25 secured to a frame part 26 located on the underside of the bed-plate 4, and cause said sleeves 16 to be depressed, withdrawing the pins 20. I have provided a means for retaining the sleeves 16 and pins 20 depressed for a predetermined interval, after each depression, which consists of the reciprocally arranged locking pins 27, one for each spindle 5 and sleeve 16, and said pins 27 have movement in brackets 28 secured to the underside of the bed-plate 4. When the sleeves 16 are elevated, having been returned to their normal positions through the action of the springs 22, the forward ends of the pins 27 will bear against the peripheral faces of the flanges 18, yieldingly held against said flanges by springs 29 encircling said pins and bearing against the bracket 28 and a lug 30 on the pin 26, and just as soon as the sleeves 16 are depressed, through the action of the cam-lugs 24 riding beneath the rollers 25 the locking pins 27 will ride off of the flange 18 into the off-set between flange 18 and head 19 of the sleeve and lock the said sleeve in a depressed position, retaining the sleeve in this position, until a mechanically operated means which is employed for releasing the pins 27 has been actuated for withdrawing said pins. When the sleeves 16 and retractable pins 20 are in an elevated position, with the pins 20 projecting up and through the slots 14 in the caps 13, said pins are in a position where the stay wire will be delivered between said pins and the strand wires projecting up through the spindles, and when the spindles are operated the pins 20 will engage the stay to direct it around or about a strand wire, by first looping the said stay wire, or not, depending on whether the pin is a part of an intermediate coiler or an end coiler, and as the collar 16 is depressed drawing the pin with it, through the slot 14 and down into the head 6, that portion of the stay wire engaged by said pin will be drawn down through the slot 14 into the recess 15 in the plate 13, when the acting wall 15ᵃ of the plate 13 will engage and cause that portion of the stay to be wrapped around the strand wire passing through the spindle. It is intended that each pin 20 of the intermediate coilers or spindles 5 will form a loop in the stay, as shown in Figs. 10 and 12, and that the pins 20 of the end coilers or spindles, instead of forming a loop will engage the end of the stay to draw it down into the recess 15 of the plate 13, and as the coiler or spindle revolves the end of the stay will be directed around the marginal wires, by being coiled thereon, such operation of coiling the ends of the stays about the margin wires, having reference to both marginal wires. The pins 20 for forming the loops are straight pins, as shown in Figs. 9, 10, 11 and 12 and when depressed are drawn down into the heads 6, whereas the pins 20 for the end coilers are each provided with a laterally extended portion 31 which, when the pin 20 and its sleeve 16 is depressed will engage the end of the stay wire, as shown in Figs. 9, 10 and 13 and draw the same down into the recess 15 of the plate 13. However, it is provided that the pins 20 of the end coilers or spindles shall not be depressed as far as the pins 20 of the intermediate coilers or spindles, and to do this the flanges 18 of the end coilers or spindles are not so deep, while greater depth is given to the heads 19 and the cam-lugs 24 are correspondingly reduced. See Figs. 23 and 24 where the construction of the end coilers and modified cam-lugs, is shown. In this way, when the cam-lugs 24 of the end coilers or spindles ride beneath the rollers 25 the sleeves 16 will not be depressed so much, allowing for drawing the pins 20 with the extended portions 31 down into the wrapping heads the distance shown in Fig. 13, which will hold the ends of the stay until they have been directed around the marginal wires.

I will now describe the stay magazine, its relation to the wrapping heads and the loopers, how the stay-feed-wire is fed to said magazine, the stays severed from the length of wire, and finally how the stay sections are delivered from the magazine to the wrapping heads and looping or coiling pins. The magazine is designated 32, being what may be termed a drum, the opposite ends thereof being reduced and journaled in suitable boxings 33 attached to the bed-plate 4. This drum is disposed transversely to the axis of the coiling spindles and arranged upon the bed-plate directly in front of the several wrapping heads 6 in said bed-plate, whereby the stay-feed-wire is fed endwise into or onto the drum and as the drum is revolved the stay sections will be moved sidewise to deliver the same to the wrappers and loopers or coiling pins. The drum 32 is provided with a plurality of suitably spaced wire receiving grooves 34 extending longitudinally of the drum and preferably opening out of the peripheral face of the drum, into which said grooves 34 a stay section is successively placed by feeding the stay-feed-wire endwise into each of said grooves, when they reach a predetermined position, and the drum is stopped, the movement of the drum shearing the stay section from the stay-feed-wire, in a manner to be explained. 35 is a guide bar supported by the bed-plate 4 and is disposed in front of and adjacent to the drum. It has the concave face 36 partially encircling the drum and maintains the stay sections in operative position in the grooves 34 during a partial rotation of the drum. To said guide bar 35 are attached a plurality of curved guide fingers 37 which extend over the drum and partially encircle the same to prevent displacement of the stays in the grooves 34 of the drum after said grooves leave the guide bar and until it is time to deliver the stays from the drum. 38 denotes annular grooves which are cut circumferentially of the drum at suitable points throughout its length, into which, coincident with each wrapper head and its pin, projects a wedge-shaped end 39 of blocks 40 attached to the bed-plate, see Fig. 5. Said wedge-shaped end 39 has the inclined or beveled working face 41 which extends over the wrapping head 6 and in the path of movement of the pin 20 of said head. However said wedge-shaped ends of the blocks 40 are cut away or formed with an off-set 42 to allow the pins 20 to project through the head 6 and plate 13 the required distance, and when said head or heads 6 are stationary preparatory to receiving a stay from the drum 32 the pins are projected through the heads and caps but beneath the off-set portions 42 of the blocks 40, so that when a stay is discharged from or forced out of a groove 34 in the drum, said stay will ride down over the inclined or beveled faces 41 of the blocks 40 and be deposited onto the heads 6 between the pin 20 and the strand wires projecting up through the spindles 5 and heads 6, and against guide-pins 150 extending up from the bed-plate 4, the said pins being preferably arranged in a line intersecting the axes of the twisters.

Figure 1:
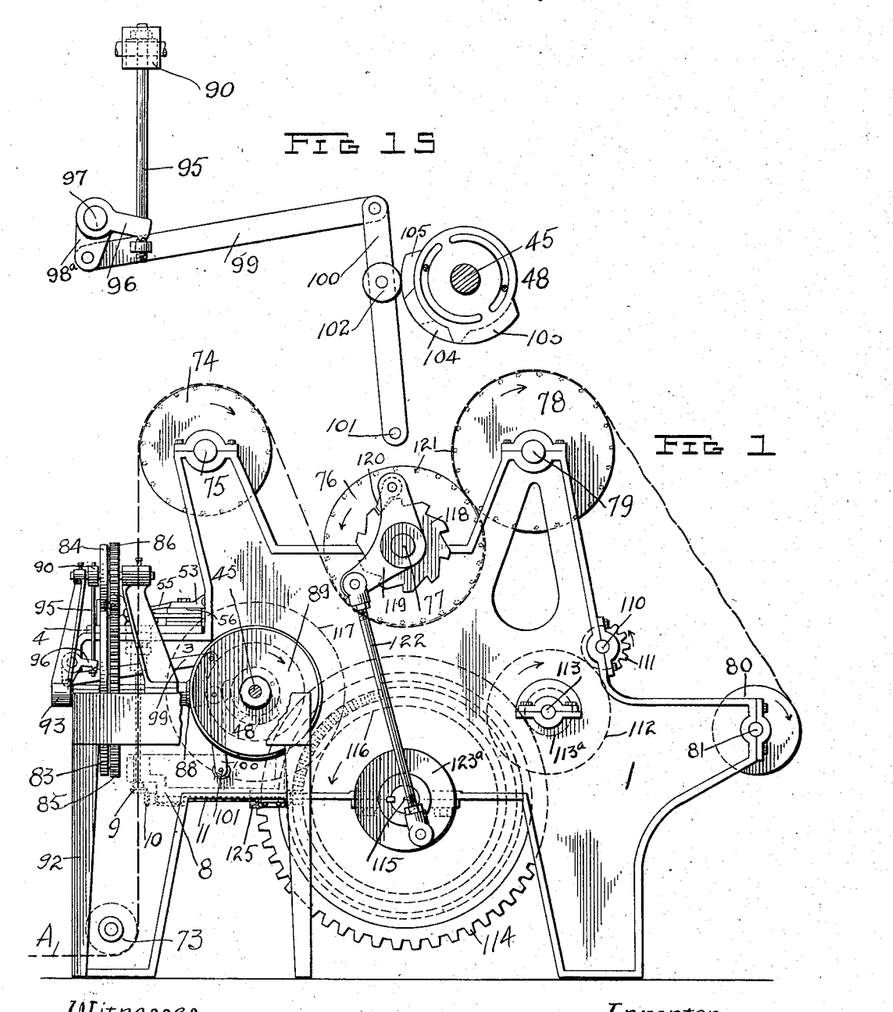
Figure 1 is a side elevation of a machine embodying my invention, looking at the side of the machine supporting the stay-feed-wire mechanism.
Figures 2, 16:
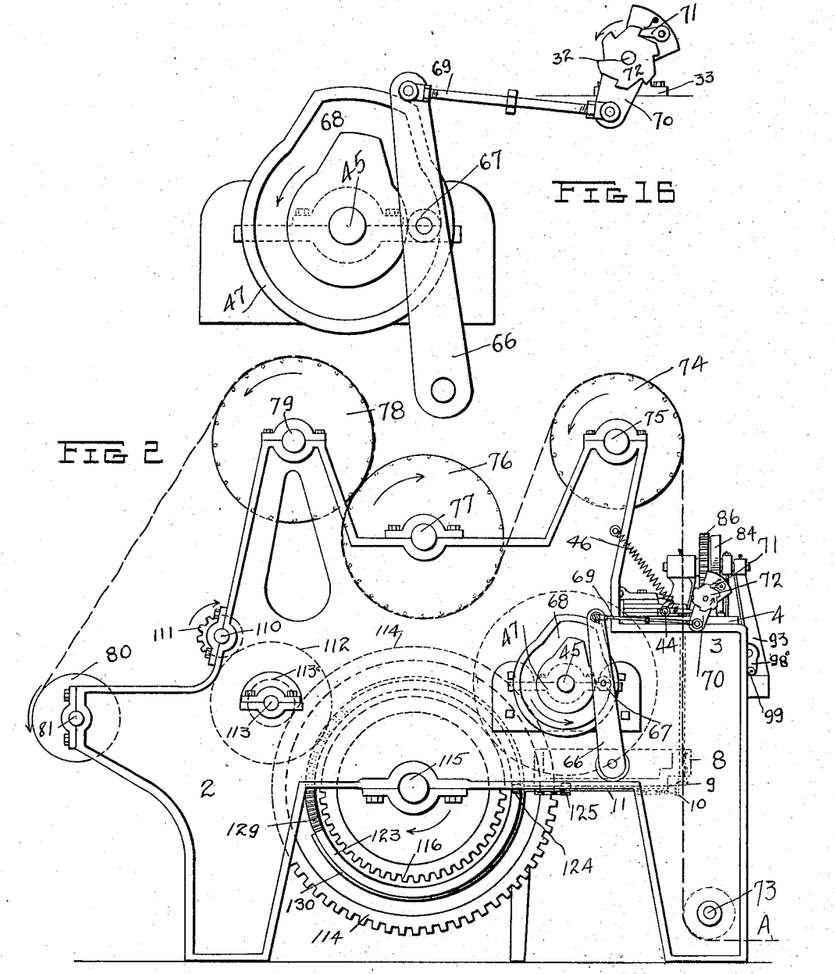
Fig. 2 is a side elevation of the opposite side of the machine.
Fig. 16 is an enlarged side elevation of parts seen in Fig. 2 for imparting a step-by-step movement to the stay magazine.
Figure 8:
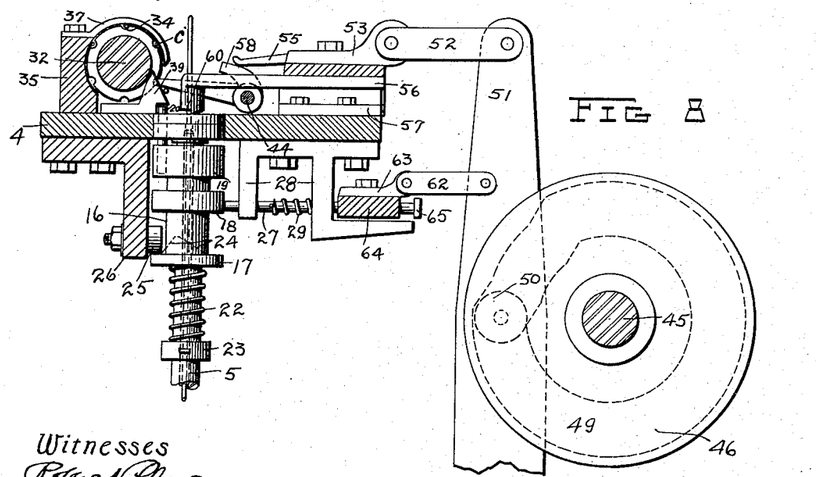
Fig. 8 is a view similar to Fig. 5, except that the stay wire has not quite reached its position on the coiling spindles, and a new stay section is being fed to the magazine.

Pivotally supported so as to have oscillatory movement in the grooves 38 of the drum 32, intermediate those coincident with the wrapping heads, are fingers 43. These fingers 43 are attached to a rocking rod 44 journaled in boxings 45 secured to the bed-plate 4. After the formation of a stay, that is by attaching the same to the strand wires, in manner previously explained, and when the strand wires are pulled out or advanced a predetermined distance, the stay will lift the fingers 43, assisted by the spring 46, see Fig. 2, and rock the rod 44. The rod and fingers will remain in such position until the drum is moved to advance a stay to delivering position, when means which I will now describe will be actuated for forcibly lowering the fingers 43, and said fingers as they are lowered will operate in their respective grooves 38 in the drum, in manner seen in Fig. 8 and insure the discharge of a stay from the magazine and its delivery on the heads 6, between the pins 20 and strand wires, as explained. 45 designates a cam-shaft, so called, because it carries a plurality of similar cam-wheels 46, a cam-wheel 47 on one end (see Fig. 2), and a fan-shaped cam-wheel 48, (see Figs. 1 and 15). Although the figures of the drawings show only one such cam-wheel 46, it is designed to use not less than two, and as many more may be used as are found desirable. Each cam-wheel 46 has a cam-groove 49 in which operates a roller 50 carried by a lever 51 pivotally attached at its lower end to the cross-frame 8. These levers are oscillated forward and backward with each revolution of the cam-wheels 46. To the upper ends of the levers are attached links 52 which are also attached to brackets 53 secured to a bar 54 and to said bar are attached a plurality of fingers 55, for certain of the fingers 43 on the rocking rod 44, also a plurality of presser arms 56 movable in guides 57 on the base-plate 4. The fingers 55 are adapted to engage arms 58 formed integral with or attached to certain of the fingers 43, in manner seen in Figs. 5, 6, 7 and 8. That is to say, simultaneously with the pulling out of the fence fabric, whereby a stay will raise the fingers 43 in the manner previously explained, the cam-wheels 46 are in a position for operating the levers 51 to move said levers from the position seen in Fig. 7, during which operation the fingers 55 will be moved out of the way to allow the fingers 43 to be raised; but just as soon as the pulling out operation is completed and the drum 32 has moved to a position to deliver a stay, the cam-wheels 46 will have moved to a position to operate the levers 51 and force the fingers 55 forwardly causing them to engage the arms 58 which will forcibly lower fingers 43 and cause said fingers to operate on a stay, as previously explained.

Figure 5:
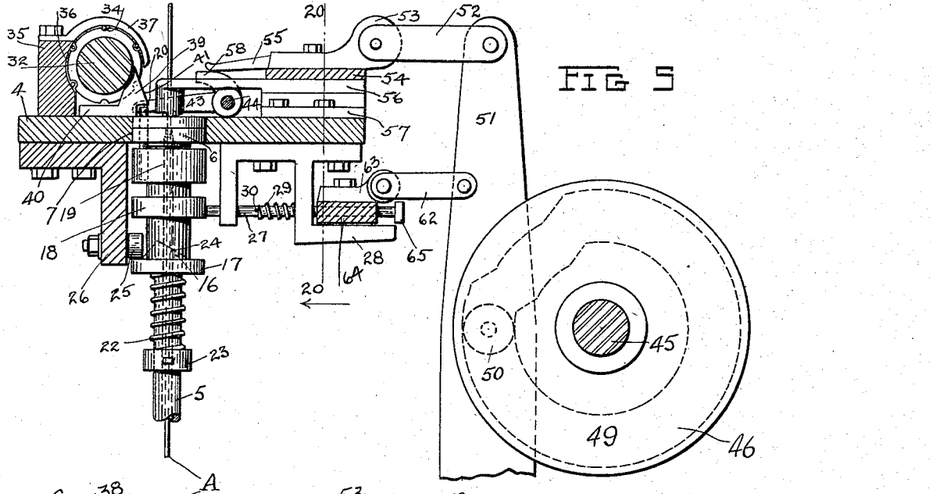
Fig. 5 is an enlarged cross-section of the magazine feed for the stay wires, as the same would appear if taken on the line 5—5 of Fig. 3; also showing in elevation a part of one of the coiling spindles, its wrapping head and retractable pin; also one of the presser arms and the means coöperating with the sleeve to which the retractable pin is attached. The several parts are shown in position at the moment when the coiling spindle is about to be operated for first looping a stay and subsequently wrapping said loop about a strand wire and at a time during the operation of feeding a stay section to the magazine.
Figure 7:
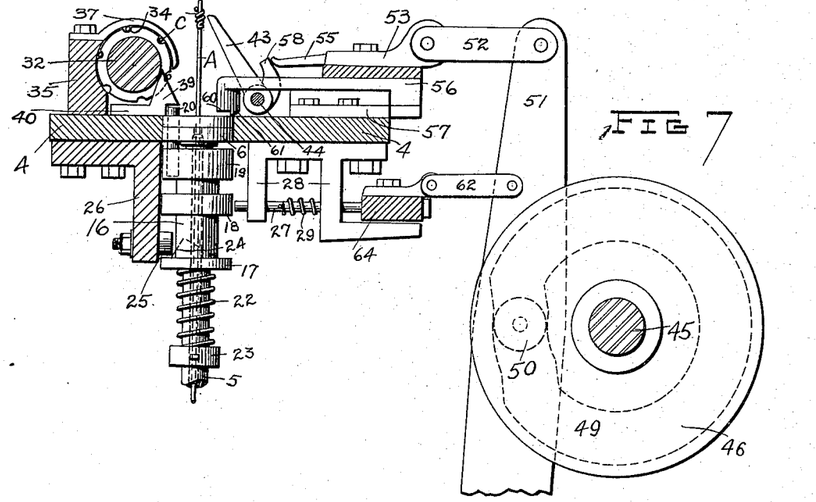
Fig. 7 is a view similar to Fig. 5 except that the magazine is being revolved to deliver a stay wire to the coiling spindles, which are at rest, and the fabric is being drawn out.

The presser arms 56 are formed with vertical slots 59 at their outer ends in which may be seated the strand wires, in manner seen in Fig. 5; the said slots making it possible to move the presser arms toward and from the strand wires, see Figs. 5 and 7. The lower face of the forward ends of the arms 56 are off-set forming a shoulder 60 and such off-set makes it possible to receive a stay beneath the forward ends of the arms 56 and the top of the wrapping heads, see Fig. 5, when the stay is moved to receiving position on the heads from the drum 32. Just as soon as a stay is in operative position on the wrapping heads, the spindles 5 are successively operated, causing the pins 20 to engage the stay wire which will force it against the strand beneath the arm 56 and also against the shoulder 60, the arm 56 remaining in its forward position until the loop has been formed and directed around the strand wire, when it may be moved to inoperative position, as shown in Fig. 7. However, before the arms 56 move to their inoperative position, the pins 20 have carried the body of the stay in the rear of that portion of the arm 56 having the slots 59 and said arms at the rear of said slots are beveled as at 61 so as to assist the pins in forcing the stay down into the wrapping heads through slots 14 in the caps 13.

Figure 6:
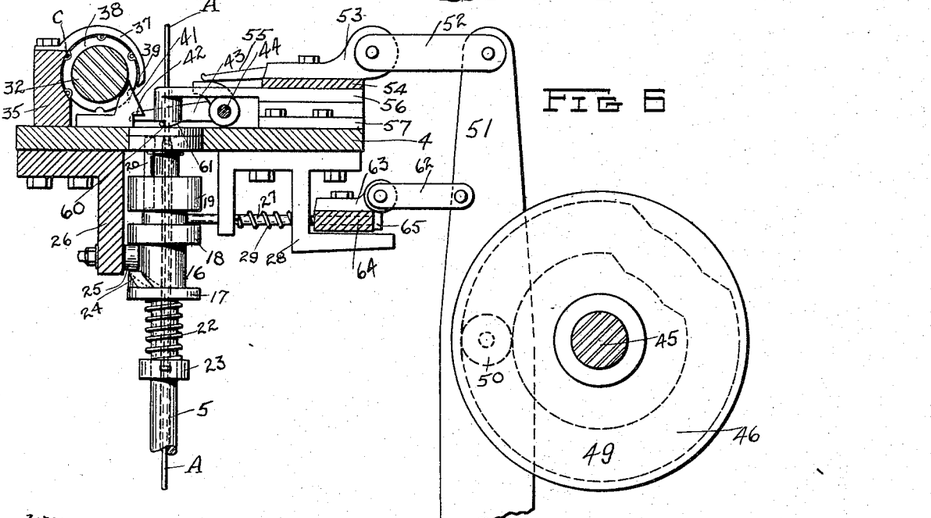
Fig. 6 is a view similar to Fig. 5, except that the parts are in a position with the looping pin retracted, after forming a loop, and the wrapping head in the act of wrapping the loop about a strand wire.

When the levers 51 are operated to retract the fingers 55 and arms 56 to allow the fabric with a completed stay to be drawn upward or outward, they also operate to retract the pins 27 or withdraw them from that position shown in Fig. 6 to that position shown in Fig. 7. This is accomplished by attaching to the levers 51 links 62 attached to brackets 63 secured to a bar 64 slidably mounted in the brackets 28, previously referred to. The pins 27 in addition to passing through the brackets 28 pass loosely through the bar 64 and on their outer ends have heads 65. The heads of the pins 27 are normally spaced from the bar 64, as shown in Fig. 5, but when they have been moved to locking position by the spring 29 (see Fig. 6) the heads 65 are brought in engagement with the bar 64. This places the pins 27 in such a position, that just as soon as the levers 51 are swung to retract the fingers 55 and arms 56 they will also operate to release the pins 27 by moving the bar 64 and correspondingly the pins 27. Such movement of the pins will release the sleeves 16 allowing the springs 22 to expand, returning the sleeves 16 and pins 20 to their upward or normal positions. The return of the levers 51, as will be noted, will not disturb the position of the pins 27 and they will not again be operated until after they have moved to a locking position, in which position they are shown in Fig. 6. The fingers 43, 55, presser arms 56 and locking pins 27 must all be released simultaneously and concurrently to allow first, the fabric to be pulled out and second, the pins 20 to be returned to their normal or initial positions, and the cams 46, levers 51 and connections described with the levers 51, as shown, will accomplish the result desired. Also, it is intended that as the fabric is pulled out the drum 32 will be partially rotated to deliver a stay to operative position to be delivered to the wrapping heads and their pins. The drum operating means will now be described.

To the frame part 2 (see Figs. 2 and 16) is pivotally attached a lever 66. To said lever is attached a roller 67 operating in a cam-groove 68 of the cam-wheel 47. With each complete rotation of this cam-wheel the lever 66 is swung forward and back. To the free end of the lever 66 is connected a rod 69, preferably adjustable lengthwise, and said rod at its opposite end is connected with a plate 70 pivotally carried on one of the reduced ends of the drum 32 so as to have movement independent of the drum. To the plate 70 is pivoted a spring held pawl 71 adapted to operate a ratchet wheel 72 on the end of the drum 32 to advance the drum the distance of one tooth of the ratchet wheel with each operation of the lever 66.

The strand wires, for convenience, will be referred to as A, the stay-feed-wire as B, and the stay sections which are severed from the stay-feed-wire, as C. The strand wires A may be fed to the spindles 5 from the coils or bundles or may be spooled, passing under the roller 73 (see Figs. 1 and 2), up through the spindles 5 over the drum 74 on shaft 75, down and around the pull-out drum 76 on shaft 77, up and over the drum 78 on shaft 79, and down and around the reel or fabric wrapper 80 on shaft 81. The means of operating the several shafts will be hereinafter explained.

Figures 2, 21:
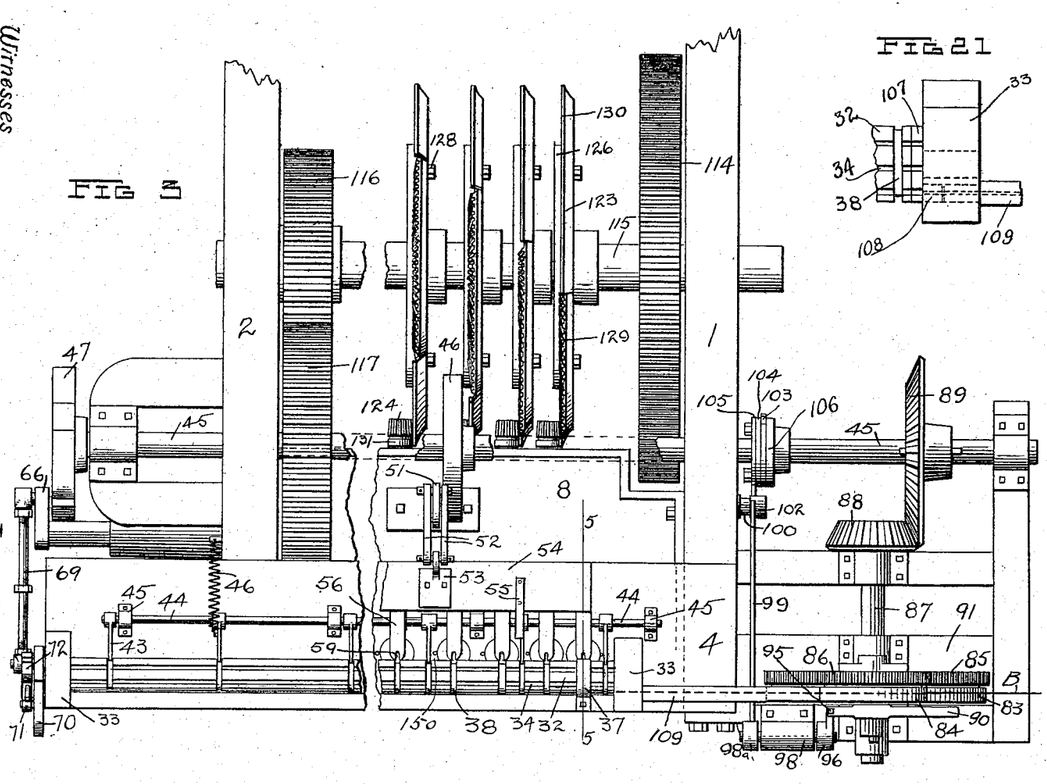
Fig. 21 is a detail in plan showing the arrangement of the cutter for the stay sections from the stay-feed-wire.
Figure 3:
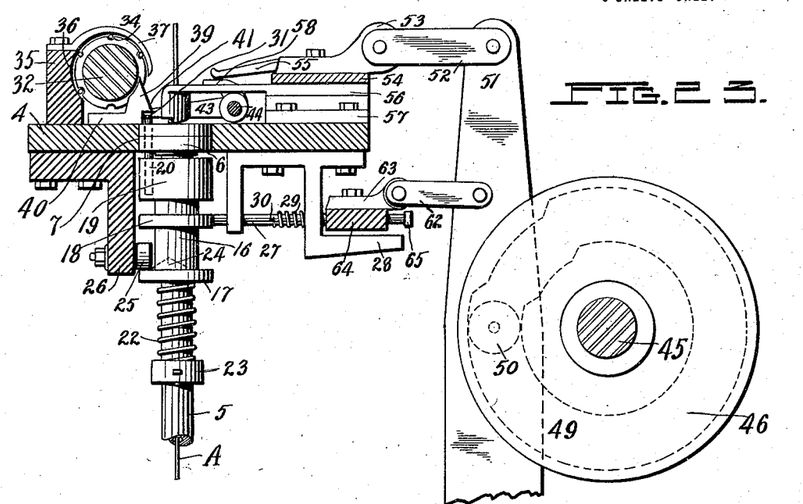
Fig. 3 is a plan view of the machine, on a much larger scale than Figs. 1 and 2, with parts broken away.
Figure 4:
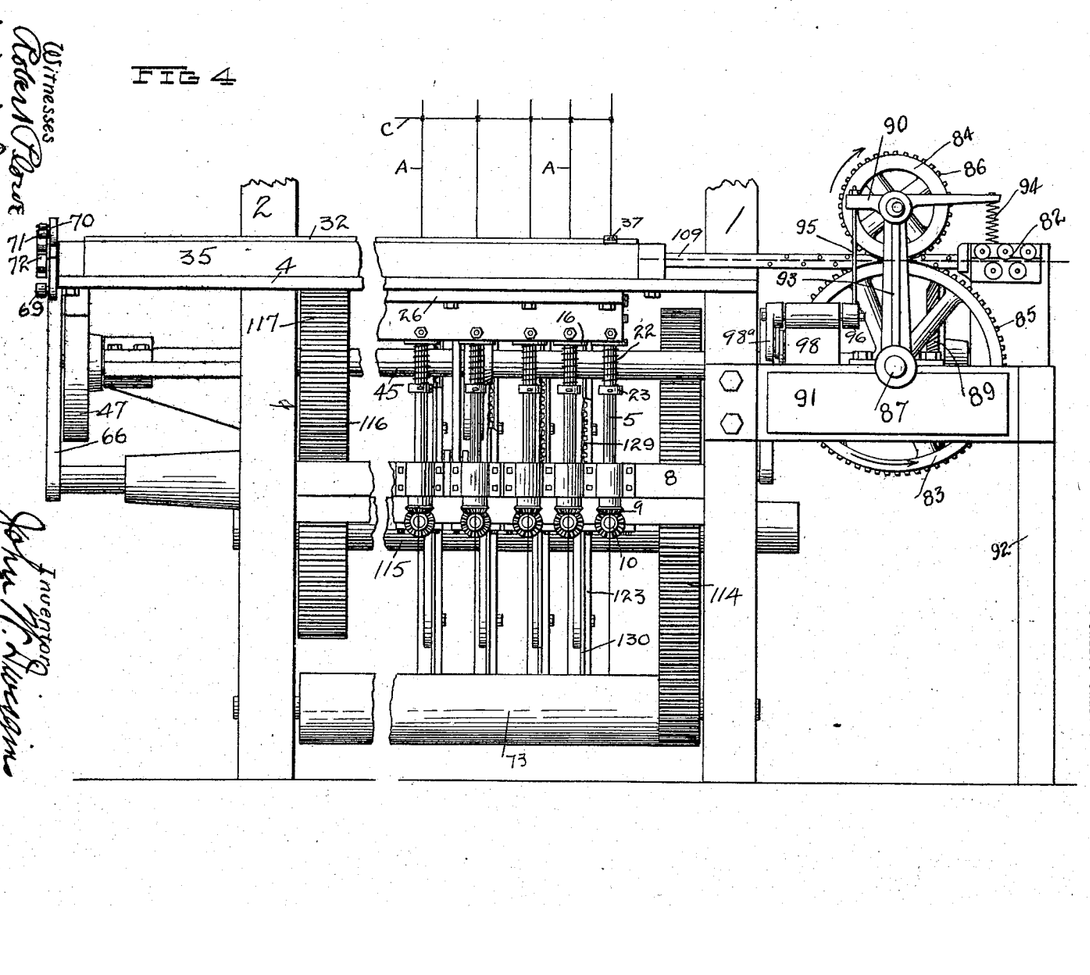
Fig. 4 is a front elevation of Fig. 3.

The stay-feed-wire B is fed from a suitable supply, such as the roll or bundle or from spools on which it may be wound, and passes through the straightening rolls 82 of well known construction and between the friction feed wheels 83 and 84. The wheels 83 and 84 have attached thereto or formed integrally therewith intermeshing gear wheels 85 and 86, the construction of the gear wheels being such that they may be continuously operated and yet only intermittently feed the stay-feed-wire between the feed wheels 83 and 84. This is accomplished by mounting the feed wheel 83 and its gear wheel 85 on a shaft 87 which is operated by a bevel pinion 88 in meshing relation with a bevel gear wheel 89 on one end of the cam-shaft 45. The feed wheel 84 and its gear wheel 86 are carried by a movable bearing which is operatively connected to an oscillatory arm 90 for moving the feed wheels 83 and 84 into impinging relation to frictionally advance the stay-feed-wire B entering therebetween. While the feed wheel 84 and its gear wheel 86 may be moved toward and from the feed wheel 83 and its gear wheel 85, the meshing relation between said gear wheels 85 and 86 is never disturbed, except to partially separate the gear teeth of said wheels. A framework comprising the table 91, legs 92 and standard 93 forms a suitable support for the parts of the stay-feed-wire mechanism just referred to and other component parts. The arm 90 has ends of unequal length, its longer end having connected therewith a spring 94 which is also connected to the frame of the machine for normally holding the feed wheels 83 and 84 in inoperative relation. To the shorter end of the arm 90 is connected a rod 95 and this rod carries an adjustable nut on its lower end which is adapted to be engaged by a short arm 96 for depressing said rod 95. The arm 96 is carried by a rock shaft 97 journaled in a bearing 98 supported by the table 91, and on the opposite end of the shaft 97 is attached a crank 98ª pivotally connected with a bar 99 in turn pivotally connected to a lever 100 fulcrumed to the frame 1 at 101. The lever 100 carries a roller 102 which is acted upon by the fan-cam-wheel 48 on the end of the cam-shaft 45. This cam-wheel 48 is composed of a plurality of sections 103, 104 and 105, and the said sections are adjustably attached to a plate 106 secured to the shaft 45. The adjustment of the sections 103, 104 and 105 on the plate 106 will shorten or lengthen the period of time during which the lever 100 is held outwardly and the rod 95 depressed for causing the feed wheels 83 and 84 to impinge upon the stay-feed-wire B for feeding a stay section C to the drum 32. The sections 103, 104 and 105 are adjusted to regulate the length of a stay section fed to the drum 32, as will be understood. The broad idea involved in this stay-feed mechanism is not new with me. To sever a stay section C from the stay-feed-wire B, after a proper length has been fed into one of the grooves 34 in the drum, I attach a hardened steel plate 107 to the end of the drum, adjacent the feed and this plate coöperates with a hardened steel plug 108 in the bearing 33 (see Fig. 21). This plug has a wire opening and it communicates with the grooves 34 of the drum when said drum is at rest, and also with a wire opening in a guide 109 leading from the feed wheels 83 and 84.

The reel or wrapper 80 may be operated in any suitable manner. The main drive shaft for imparting power to the several other shafts and operative parts of the machine, is designated as 110 and may receive its power from any suitable source of power. It carries a gear wheel 111 in mesh with a gear wheel 112 on a counter shaft 113 and said counter shaft 113 carries a gear wheel 113ª in mesh with a gear wheel 114 on a driving shaft 115. This shaft 115 imparts power to the spindles 5 in a manner which I will explain, and also imparts power to the cam-shaft 45 through meshing gears 116 and 117 carried respectively on the shafts 115 and 45 and is also employed to transmit movement to the shaft 77.

To operate the shaft 77 from the shaft 115, I provide the shaft 77 with a ratchet wheel 118 and also with a plate 119 to which is attached a ratchet pawl 120 adapted to to move a stay section to position to be discharged onto the wrapping heads, when the fingers are moved to operative position. It is understood the fabric with a newly-attached stay cannot advance until the presser arms 56 are retracted sufficiently to allow the stay to be elevated, so that the position of the cam-wheels 46 must be such that they will operate to retract the presser arms enough in advance of the pull-out mechanism so that the movement of the stay and fabric will not be interfered with.

Having thus fully described my invention, what I claim and desire to secure by Letters Patent of the United States, is:—

1. A wire-fabric-making machine having, in combination, a series of twisters for attaching a stay-wire to a series of strands, bevel-pinions on the twister spindles, a drive-shaft, a series of mutilated gear-wheels having toothed portions set at successively different angles thereon, and gearing interposed between said mutilated gears and the bevel-pinions on the spindles.

2. A wire fabric loom, including a series of twisters, and twister operating mechanism including a series of driving gears, one for each of said twisters except the first one, said driving gears being arranged out of line and said twisters being in line, whereby relative movement of the gears and twisters will cause the twisters to be brought into action one after another.

3. A wire fabric loom, including a plurality of wire connecting devices operative to connect the same stay to a series of wires, certain of said devices provided with retractable hooked pins and certain other of said devices having only straight pins, mechanism for concurrently operating certain of said devices having straight and hooked pins, and mechanism for progressively operating the remainder of said devices.

4. In a wire fabric loom, in combination, a plurality of wire connecting devices, a drum having a plurality of wire receiving grooves disposed transversely of said devices, means for feeding stay sections endwise to the grooves in said drum, means for operating the drum to deliver the stay sections laterally to said devices, pivotally supported fingers coöperating with said drum for discharging the stays from the drum onto the devices, and means for operating said fingers.

5. In a wire fabric loom, in combination, a plurality of loopers and twisters arranged to form loops in the stay and to wrap said loops upon a series of line wires, means for operating said loopers and twisters, a transversely disposed stay carrier, means for feeding stays to the carrier, means for intermittently operating said carrier, guide blocks for insuring the deposit of the stay between the loopers and strand wires extending through the twisters, and fingers coöperating with the drum to insure the discharge of the stays from the drum onto the twisters.

6. In a wire fabric loom, in combination, a plurality of wire carrying spindles, a wrapping head and a wire engaging pin on each spindle, a slidable sleeve on each spindle carrying said pins, means for operating the spindles, means for sliding said sleeves and retracting said pins, transversely disposed locking pins for engaging and holding the sleeves and pins retracted, and means for releasing said locking pins from the sleeves.

7. In a wire fabric loom, in combination, a spindle having a wrapping head, a flanged sleeve slidable on the spindle and carrying a pin movable through the wrapping head, a cam block on said sleeve adapted to engage a roller for retracting said sleeve and pin, means movable into the path of a flange of the sleeve for preventing its return to normal position, means for retracting said sleeve holding means, and means for returning the sleeve to normal position when released.

8. In a wire fabric loom, in combination, a plurality of loopers and wrappers arranged to form loops in the stay and to wrap said loops upon a series of line wires, a revoluble stay carrier having a plurality of wire receiving grooves, means for advancing the carrier in a step-by-step movement, a guide bar for one side of said carrier, guide fingers attached to said bar and overhanging said carrier, and oscillatory members coöperating with said carrier for forcing said stays from the carrier onto the wrappers.

9. In a wire fabric loom, in combination, a plurality of loopers and wrappers arranged to form loops in the stay and to wrap said loops upon a series of line wires, a revoluble stay wire carrying drum, means for operating said loopers and wrappers, means for supplying said drum with a stay during the operation of the loopers and wrappers, means for operating the drum in a step-by-step movement, guides for the stays on the drum, and means coöperating with the drum for forcing the stays from the drum on to the wrappers.

10. In a wire fabric loom, in combination, a plurality of spindles each having a wrapping head, a sleeve slidable on each spindle, a retractable pin attached to each sleeve, a drum having a series of wire grooves, means for intermittently rotating said drum, a locking pin for each sleeve to hold it and its pin in a retracted position, a bar common to all of said locking pins, a presser arm coöperating with each wrapping head, a plurality of fingers coöperating with the drum to insure the delivery of stays from engage with the teeth of the ratchet wheel 118 to impart a step by step movement to said shaft 77. As the drum 76 moves with the shaft 77 it will draw the fabric over the drum 74 and around the drum 76, and will also operate the drum 78. The fabric moving between the two drums 76 and 78 will be suitably crimped, the drums being provided with rods 121 suitably arranged for this purpose. To the plate 119 is connected a rod 122 and said rod is pivotally attached to a disk 123ª on the shaft 115.

I will now describe the means for progressively operating certain of the spindles 5 and for concurrently operating certain other of said spindles. On the shaft 115 are a plurality of mutilated gear wheels 123, one for each of the spindles 5, except the first one; the first one being driven concurrently with and from the horizontally disposed shaft 11 from which the second spindle 5 is driven. That is to say, for each of the shafts 11 except the first one, a bevel gear wheel 124 is provided which will intermittently mesh with the teeth of the wheels 123. The first shaft 11 is minus the wheel 124 but it and the second shaft 11 have meshing spur pinions 125, so that as power is imparted to the second spindle 5 so will power be imparted to the first spindle 5 through the pinions 125. The first spindle 5 will rotate in just the opposite direction to all the other spindles, as it is desired to draw the wire for the loops from the opposite end of the stay and it is necessary to operate the first and second spindles concurrently to prevent the wire for the first loop being drawn from the end of the stay being wrapped by the first wrapping head around the margin wire.

The mutilated gear wheels 123 are each connected to the shaft 115 by attaching said wheels in an adjustable manner to plates 126 secured to said shaft 115, the wheels being provided with arc-shaped slots 127 through which bolts 128 are passed for holding the wheels on the plates. Loosening the bolts 128 allows for adjusting the several wheels so that the gear-teeth of the wheels may be disposed at relatively different angles, whereby the first and second spindles may be started to rotate before the third spindle, and the third spindle started to rotate before the fourth, and so on throughout the series. It is intended that each of the spindles shall make one-half of a revolution before the next one is started, which is sufficient to allow for making the loop in the stay, except of course, it is understood that the first and second act concurrently, and as the successive spindles are progressively put into motion, there will be several operating simultaneously. The gear wheels 123 have the segmental bevel-toothed portions 129, with which the bevel gears 124 have a meshing relation intermittently during the rotation of said gear wheels 123. Said gear wheels 123 are also provided with the flange portions 130 terminating at the opposite ends of the gear teeth 129 of said wheels. As the wheels 123 rotate and the bevel gear wheels 124 leave the toothed portions 129 thereof, it is provided that the shafts 11 shall be held against rotation until the toothed portions 129 again enter into mesh with said bevel gear wheels 124. To accomplish this the bevel gear wheels 124 are provided with the heads 131 having flat faces 132, the flat faces of the heads coinciding and riding on the flanges 130 of the gear wheels 123 as the wheels 124 leave the toothed portions 129, maintaining the shafts 11 and spindles stationary until the toothed portions 129 again coincide and enter into mesh with the wheels 124.

The operation of the machine may be briefly described as follows: Assuming the parts of the machine to be in the position shown in Fig. 5 with a stay C having just been delivered to the loopers and wrappers and a new stay section being fed to its groove in the drum by the feed wheels 83 and 84, the mutilated gear wheel 123 which operates the first and second spindles 5 will move to position to operate said first and second spindles so as to form and wrap the first loop about a strand wire and coil the end of the stay around the margin wire. With the first revolution of said first and second spindles the sleeves 16 thereon will be depressed, retracting the pins 20 in the manner and for the purposes previously explained, and when depressed the sleeves are held by the locking pins 27. Before the first and second spindles 5 have completed their first revolution, the mutilated gear 123 for operating the third spindle has moved to a position to operate its spindle to first loop the stay and wrap said loop around a strand wire. The looping operation of the third spindle takes place before the first and second spindles have completed their wrapping and coiling movements, and thereby two or more of the spindles are operating simultaneously. This operation is progressively carried on with each of the successive gears 123 and spindles 5 until the complete stay has been attached to all of the strand wires, including the margin wires. This accomplished, the pull-out mechanism is actuated to advance the fabric the distance it is desired to place a stay, the stay just previously attached raising the fingers 43, while at the same time the cam-shaft 45 operates to retract the fingers 55, the presser arms 56 and locking pins 27, allowing the sleeves 16 to be again raised, and while this operation is taking place the lever 66 is actuated to impart movement to the drum 32 the drum to the wrapping heads, a bar common to all the presser arms, means attached to said last mentioned bar for operating said fingers, levers and connections between said levers and bars, and a cam-shaft and cam-wheels thereon for operating said levers.

11. In a wire fabric loom, in combination, an axially bored spindle, a head attached to said spindle and provided with an eccentrically arranged opening, a sleeve slidable on said spindle and carrying a pin operating through said opening in the head, a capplate having a radially arranged slot through which said pin may project and also provided with a recess in its lower face which communicates with the radially arranged slot and has a wall adapted to operate on a part of a stay to wrap the same around a strand wire passing up through said spindle.

In testimony whereof I affix my signature, in presence of two witnesses.

JOHN W. DWIGGINS.

Witnesses:
FRANK S. BAUGHN,
R. C. GRIFFITH.

Copies of this patent may be obtained for five cents each, by addressing the "Commissioner of Patents, Washington, D. C."